United States Patent
Eutsler et al.

(10) Patent No.: US 12,309,276 B1
(45) Date of Patent: May 20, 2025

(54) TOKENIZED STRUCTURED DATA SHARING

(71) Applicant: Wells Fargo Bank, N.A., San Francisco, CA (US)

(72) Inventors: Nathaniel C. Eutsler, San Francisco, CA (US); Matthew Mullin Shepherd, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 72 days.

(21) Appl. No.: 17/903,648

(22) Filed: Sep. 6, 2022

(51) Int. Cl.
H04L 9/32 (2006.01)
H04L 9/00 (2022.01)

(52) U.S. Cl.
CPC .......... H04L 9/3213 (2013.01); H04L 9/3263 (2013.01); H04L 9/50 (2022.05)

(58) Field of Classification Search
CPC ........ H04L 9/3213; H04L 9/3263; H04L 9/50
See application file for complete search history.

(56) References Cited

U.S. PATENT DOCUMENTS

| | | | |
|---|---|---|---|
| 2 A * | 7/1836 | Goulding | D01G 21/00 57/58.49 |
| 11,037,211 B2 | 6/2021 | Preston et al. | |
| 11,154,783 B1 * | 10/2021 | Koch | A63F 13/352 |
| 11,836,690 B1 | 12/2023 | Stroke et al. | |
| 2009/0324025 A1 | 12/2009 | Camp et al. | |
| 2020/0005284 A1 * | 1/2020 | Vijayan | G06Q 20/065 |
| 2020/0322154 A1 | 10/2020 | Konda et al. | |
| 2020/0342539 A1 * | 10/2020 | Doney | G06Q 20/3829 |
| 2020/0364373 A1 * | 11/2020 | Huang | H04L 9/3239 |
| 2021/0004739 A1 * | 1/2021 | Gill | G06Q 10/067 |
| 2021/0065293 A1 * | 3/2021 | Sigler | G06Q 20/24 |
| 2021/0097508 A1 * | 4/2021 | Papanikolas | G06Q 20/3678 |
| 2021/0133700 A1 * | 5/2021 | Williams | G06Q 20/367 |

(Continued)

FOREIGN PATENT DOCUMENTS

| | | |
|---|---|---|
| CN | 113706175 | 11/2021 |
| EP | 3 540 662 A1 | 9/2019 |

(Continued)

OTHER PUBLICATIONS

Dietrich et al., Classification Model Of Supply Chain Events Regarding Their Transferability To Blockchain Technology.
(Continued)

*Primary Examiner* — Jimmy H Tran
(74) *Attorney, Agent, or Firm* — Foley & Lardner LLP

(57) ABSTRACT

A system can obtain, based on a first control structure that identifies a content type, a non-fungible token (NFT) linked to a content object corresponding to the content type, encapsulate the NFT within a container having a second control structure that restricts output by the content object linked to the encapsulated NFT, and generate a control token compatible with a third control structure that restricts output by the container to a destination corresponding to the control token, determine by the third control structure that the control token is compatible with the third control structure, and transmit, by the second control structure and based on the determination that the control token is compatible with the third control structure, the output from the content object to the destination.

20 Claims, 9 Drawing Sheets

(56) References Cited

U.S. PATENT DOCUMENTS

| | | | |
|---|---|---|---|
| 2021/0150626 A1* | 5/2021 | Robotham | H04L 63/0442 |
| 2021/0248594 A1* | 8/2021 | Yantis | G06Q 20/387 |
| 2021/0281410 A1* | 9/2021 | Hain | H04N 21/254 |
| 2021/0326862 A1* | 10/2021 | Yantis | H04L 9/50 |
| 2021/0374791 A1* | 12/2021 | Kim | G06Q 20/3829 |
| 2022/0010316 A1* | 1/2022 | Novick | C12N 15/63 |
| 2022/0027902 A1* | 1/2022 | Vandenberg | G06Q 20/223 |
| 2022/0058630 A1 | 2/2022 | Yantis et al. | |
| 2022/0058633 A1* | 2/2022 | Yantis | G06Q 20/4016 |
| 2022/0075845 A1* | 3/2022 | Bowen | G06F 30/30 |
| 2022/0101316 A1* | 3/2022 | Cramer | G06Q 20/3825 |
| 2022/0222364 A1 | 7/2022 | Roberts et al. | |
| 2023/0011621 A1* | 1/2023 | Jakobsson | H04L 9/3213 |
| 2023/0034169 A1 | 2/2023 | Ferenczi | |
| 2023/0045071 A1* | 2/2023 | Kalaldeh | G06Q 30/018 |
| 2023/0088936 A1* | 3/2023 | Chalkley | H04L 9/3213 705/26.81 |
| 2023/0102889 A1* | 3/2023 | Keiter | G06F 21/105 705/59 |
| 2023/0114684 A1 | 4/2023 | Jakobsson et al. | |
| 2023/0135947 A1* | 5/2023 | Barhudarian | H04L 9/30 726/26 |
| 2023/0137867 A1 | 5/2023 | Walters et al. | |
| 2023/0139878 A1* | 5/2023 | Clark | H04L 9/3297 713/157 |
| 2023/0315819 A1* | 10/2023 | Guy | A63F 13/73 726/28 |
| 2023/0351347 A1* | 11/2023 | Damrow | G06Q 20/102 |
| 2024/0012915 A1* | 1/2024 | Andon | H04L 9/50 |
| 2024/0020624 A1* | 1/2024 | Williams | H04L 9/3213 |
| 2024/0031153 A1 | 1/2024 | Dravneek et al. | |

FOREIGN PATENT DOCUMENTS

| | | |
|---|---|---|
| KR | 2196001 B1 | 12/2020 |
| WO | WO-2021/041746 A1 | 3/2021 |
| WO | WO-2023/034423 A1 | 3/2023 |

OTHER PUBLICATIONS

Globe Newswire, "The Stoned Ape Crew NFT Evolution is Live!," (Jan. 26, 2022), https://www.globenewswire.com/en/news-release/2022/01/26/2373679/0/en/The-Stoned-Ape-Crew-NFT-Evolution-is-Live.html, pp. 1-4.

Gupta et al., "NFTs and the Cryptoverse," (Sep. 25, 2021), https://www.cryptechie.com/p/nft, pp. 1-23.

Ismail et al., TRABAC: A Tokenized Role-Attribute Based Access Control using Smart Contract for Supply Chain Applications.

Johnson et al., Creating Generative Art NFTs from Genomic Data.

La Fountain et al., "Non-Fungible Tokens, Libraries, and Publishers," (Jul./Aug. 2021), https://www.infotoday.com/OnlineSearcher/Articles/Features/NonFungible-Tokens-Libraries-and-Publishers-147856.shtml, pp. 1-5.

Raza et al., "Wells Fargo To Launch Digital Asset For Internal Transactions," (Sep. 18, 2019), https://insidebitcoins.com/news/wells-fargo-to-launch-digital-asset-for-internal-transactions, pp. 1-4.

Tahtacioglu et al., NFT with Chainlink Oracle—Blockchain Roadmap.

XHashtag, "Introducing #Selena—The First Liquid NFT Collection on Solana," Sep. 22, 2021, downloaded Sep. 13, 2022, https://medium.com/xhashtag/introducing-selena-the-first-liquid-nft-collection-on-solana-da568f6311d5.

Murray, Michael D. "N FT ownership and copyrights." Ind. L. Rev. 56 (2022): 367. (Year: 2022).

Investopedia, "Blockchain Explained," 2021, The Wayback Machine, pp. 1-29.

* cited by examiner

TOKENIZED STRUCTURED DATA SHARING

TECHNICAL FIELD

The present implementations relate generally to electronic content delivery, and more particularly to tokenized structured data sharing.

INTRODUCTION

Transmitting content from one location to another can subject that content to increasing risk of unauthorized interception. As demands on volume and rate of data transmissions increases, restrictions on request for data that focus transmission efficiently to authorized sources and systems is increasingly desired.

SUMMARY

Aspects of this technical solution are directed to secure aggregation and coordinated transmission of output of NFTs. A smart contract can include one or more NFTs that have particular characteristics, and that generate particular corresponding outputs. The smart contract can include multiple layers of authorization control to restrict access to the output of content objects linked to the NFTs, as a group. For example, a smart contract can contain multiple NFTs each associated with video content by a particular publisher. For example, a smart contract can contain multiple NFTs each associated with a payment-generating asset having a particular payment processing schedule or period. The smart contract can restrict output to request including one or more NFTs and content tokens, and can include a mixture of restrictions including authorized parties and authorized computing systems. Thus, a technological solution for tokenized structured data sharing is provided.

Aspects of this technical solution are directed to a system. The system can include a data processing system can include memory and one or more processors. The data processing system can obtain, based on a first control structure that identifies a content type, a non-fungible token (NFT) linked to a content object corresponding to the content type. The data processing system can encapsulate the NFT within a container having a second control structure that restricts output by the content object linked to the encapsulated NFT. The data processing system can generate a control token compatible with a third control structure that restricts output by the container to a destination corresponding to the control token. The data processing system can determine by the third control structure that the control token is compatible with the third control structure. The data processing system can transmit, by the second control structure and based on the determination that the control token is compatible with the third control structure, the output from the content object to the destination.

The NFT can include a plurality of NFTs each linked to corresponding ones of a plurality of content objects can include the content object. The first control structure can include a first smart contract that includes a parameter, the data processing system to link, in response to a determination that the content object corresponds to the content type, the parameter of the first smart contract to the NFT. The second control structure can include a second smart contract that includes a first control heuristic, the data processing system to transmit, in response to a determination by the first control heuristic that a second NFT corresponding to the container is detected by the second smart contract, output by the content object to the destination. The NFT can include a private key and the container can include an encapsulation layer compatible with the private key. The third control structure can include a third smart contract that includes a second control heuristic, the data processing system to transmit, in response to a determination by the second control heuristic that the control token is authorized by the third smart contract, output by the content object to the destination. The data processing system can modify a first data structure distributed over a plurality of data locations to include a first reference to the container. The data processing system can modify a second data structure distributed over one or more of the plurality of data locations to include a second reference to the content object. The control token can include a fungible token. The fungible token authorizing the destination to receive the output by the content object for a predetermined time period.

Aspects of this technical solution are directed to a method. The method can include obtaining, based on a first control structure identifying a content type, a non-fungible token (NFT) linked to a content object corresponding to the content type. The method can include encapsulating the NFT within a container having a second control structure that restricts output by the content object linked to the encapsulated NFT. The method can include generating a control token compatible with a third control structure that restricts output by the container to a destination corresponding to the control token. The method can include determining, by the third control structure, that the control token is compatible with the third control structure. The method can include transmitting, by the second control structure and based on the determination that the control token is compatible with the third control structure, the output from the content object to the destination.

The NFT can include a plurality of NFTs each linked to corresponding ones of a plurality of content objects can include the content object. The first control structure can include a first smart contract that includes a parameter. The method can include linking, in response to a determination that the content object corresponds to the content type, the parameter of the first smart contract to the NFT. The second control structure can include a second smart contract that includes a first control heuristic. The method can include transmitting, in response to a determination by the first control heuristic that a second NFT corresponding to the container is detected by the second smart contract, output by the content object to the destination. The second NFT can include a private key and the container can include an encapsulation layer compatible with the private key. The third control structure can include a third smart contract that includes a second control heuristic. The method further can include transmitting, in response to a determination by the second control heuristic that the control token is authorized by the third smart contract, output by the content object to the destination. The control token can include a fungible token.

Aspects of this technical solution are directed to a computer readable medium. The computer readable medium can include one or more instructions stored thereon and executable by a processor. The processor can obtain, by the processor and based on a first control structure that identifies a content type, a non-fungible token (NFT) linked to a content object corresponding to the content type. The processor can encapsulate, by the processor, the NFT within a container having a second control structure that restricts output by the content object linked to the encapsulated NFT. The processor can generate, by the processor, a control token compatible with a third control structure that restricts output by the container to a destination corresponding to the control token. The processor can determine, by the processor, by the third control structure that the control token is compatible with the third control structure. The processor can transmit, by the processor via the second control structure and based on the determination that the control token is compatible with the third control structure, the output from the content object to the destination.

The processor can link, by the processor in response to a determination that the content object corresponds to the content type, a parameter of a first smart contract to the NFT. The processor can transmit, by the processor in response to a determination by the a control heuristic that a second NFT corresponding to the container is detected by a second smart contract and a determination by a second control heuristic that the control token is authorized by a third smart contract, the output by the content object to the destination. The first control structure can include the first smart contract including the parameter, the second control structure can include the second smart contract including the first control heuristic, and the third control structure can include the third smart contract including the second control heuristic. The control token can include a fungible token.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

Figure 1:
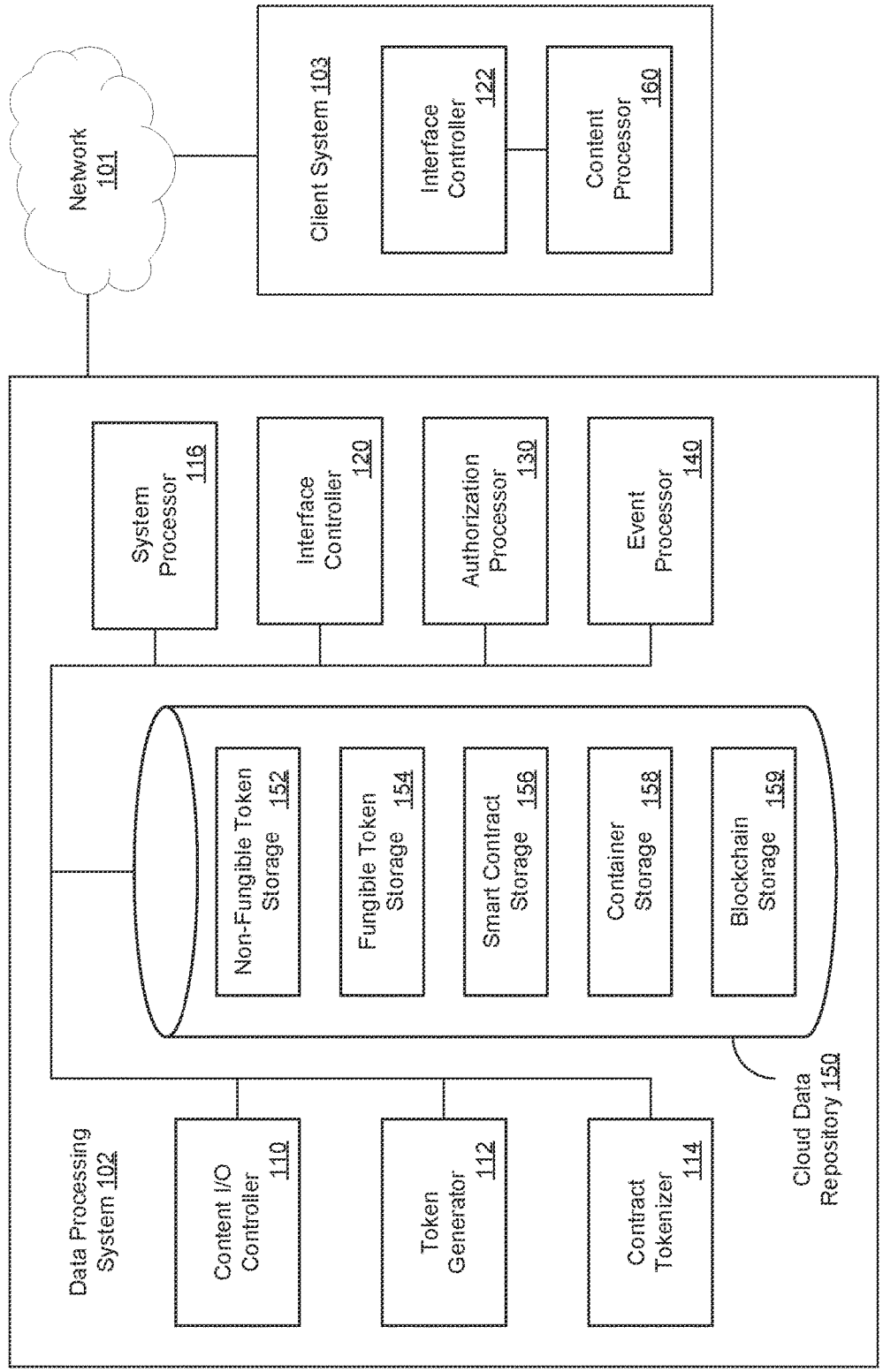
FIG. 1 illustrates a system in accordance with present implementations.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

This technical solution can include a smart contract including a secure container that encapsulates one or more NFTs. The smart contract can allow output of various content objects linked to the NFTs upon detection of particular NFTs, semi-fungible tokens, or fungible tokens compatible with the smart contract. For example, the smart contract can be restricted to execution at a particular computing environment by a secure NFT restricted to within the particular computing environment. The smart contract, and the NFTs within the smart contract, can be rendered unusable outside the particular computing environment. This technical solution can include multiple layers of secure access control to restricted NFTs, including authorization control at a smart contract layer by one or more tokens, and authorization control at a container layer by a private key. The private key can be based on one or more tokens, and can be fully contained within a single tokens or partially contained within multiple tokens. This technical solution can include generation of smart contracts and modification of blockchain architecture to restrict particular NFTs. A generator smart contract can, for example, generate or modify a smart contract to contain one or more particular NFTs. The generator smart contract can search a blockchain to identify NFTs satisfying particular parameters. The parameters can be transmitted to the generator smart contract by a content parameter token. The generator smart contract can generate a content token that can include an NFT, a semi-fungible toke, or a fungible token, and can distribute that content token while retaining locally the smart contract and its restricted NFTs.

FIG. 1 illustrates a system in accordance with present implementations. As illustrated by way of example in FIG. 1, an example system 100 can include a network 101, a data processing system 102, and a client system 103. The network 101 can be any type or form of network. The geographical scope of the network 101 can vary widely and the network 101 can be a body area network (BAN), a personal area network (PAN), a local-area network (LAN), e.g. Intranet, a metropolitan area network (MAN), a wide area network (WAN), or the Internet. The topology of the network 101 can be of any form and can include, e.g., any of the following: point-to-point, bus, star, ring, mesh, or tree. The network 101 can be an overlay network which is virtual and sits on top of one or more layers of other networks 101. The network 101 can be of any such network topology as known to those ordinarily skilled in the art capable of supporting the operations described herein. The network 101 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 101 can be a type of a broadcast network, a telecommunications network, a data communication network, or a computer network. The data processing system 102 can include a content input and output (I/O) controller 110, a token generator 112, a contract tokenizer 114, a system processor 116, an interface controller 120, an authorization processor 130, an event processor 140, and a cloud data repository 150. The client system 103 can include a computing system located remotely from the data processing system 102. The client system 103 can include an interface controller 122 and a content processor 160.

The content I/O controller 110 can obtain one or more content objects. The content I/O controller 110 can communicate with one or more external systems via the network 101, and can obtain one or more contents objects via the network 101. The content I/O controller 110 can generate content objects based on one or more output criteria that can be transmitted to a computing device, including, for example, the client system 103. The content I/O controller 110 can identify one or more characteristics of a content objet. A characteristic can include, for example, a data type, an output data type, an input data type, or any combination thereof. For example, the content I/O controller 110 can obtain and identify contents objects including video, audio, text, any media, executable programs, or any combination thereof. The content I/O controller 110 can transmit one or more of content objects or references or links with one or more content objects to the token generator 112.

The token generator 112 can generate one or more non-fungible tokens linked to particular content objects obtained from the content I/O controller 110. The token generator 112 can generate a token corresponding to a particular content object or content objects. The token generator 112 can obtain a preexisting token and can assign the preexisting token to a particular content object or content objects. The token generator 112 can generate a non-fungible token that is unique against all other tokens generated by the token generator 112 to identify content objects, a fungible token that can be generated or replicated an arbitrary number of times, and a semi-fungible token that can be generated or replicated a particular number of times below or meeting a particular replication threshold. One or more fungible tokens or semi-fungible tokens can, for example, be associated with a particular content object or the same content object. The token generator 112 can access the fungible token storage 154 to determine whether the replication threshold corresponding to a particular threshold is satisfied, and can block or forgo generation or replication of a token beyond or meeting the replication threshold in response to a determination that the replication threshold corresponding to a particular threshold is satisfied. The token generator 112 can transmit one or more of content objects or references or links with one or more content objects to the contract tokenizer 114, and can transmit one or more non-fungible tokens, fungible token, or semi-fungible tokens to the contract tokenizer 114.

The contract tokenizer 114 can generate one or more smart contracts that are executable to restrict output of one or more particular content objects based on one or more content objects. The system processor, for example, can execute smart contracts generated by the contract tokenizer 114. The contract tokenizer 114 can obtain one or more content objects and can generate a container corresponding to the content objects. For example, the contract tokenizer 114 can generate a container to encapsulate a plurality of content objects each associated with a particular content characteristic. The container can restrict access to the content objects within the container, by an encapsulation layer that, for example, encrypts all content objects within the container with a common encryption scheme. The encapsulation layer can control output of multiple content objects within the container by uniformly and concurrently decrypting the content objects according to the common encryption scheme. A content characteristic can include a type of output, a magnitude associated with the output, or any combination thereof, for example. For example, the content characteristic can include a periodic value increase in a metric of the content object, or can include a medic type associated with a media object. A media type can include, for example, video, audio, text, or any combination thereof. The contract tokenizer 114 can store one or more containers can encapsulating one or more content objects in the container storage 158.

The contract tokenizer 114 can generate a smart contract based on one or more tokens and containers. The contract tokenizer 114 can generate a smart contract including one or more executable instructions to restrict or transmit output of cone or more content objects encapsulated within a particular container. The contract tokenizer 114 can generate a smart contract that can conditionally transmit output of one or more of the content objects in response to detection of one or more tokens. The tokens can include one or more non-fungible token, fungible tokens, and semi-fungible tokens. The contract tokenizer 114 can store the smart contract to the smart contract storage 156, and can link a token to the smart contract. The contract tokenizer 114 can publish, post, or append, for example, the token linked to the smart contract to a blockchain, and can publish, post, or append, for example, one or more tokens corresponding to the smart contract to a blockchain.

The system processor 116 can execute one or more instructions associated with the system 100. The system processor 116 can include an electronic processor, an integrated circuit, or the like including one or more of digital logic, analog logic, digital sensors, analog sensors, communication buses, volatile memory, nonvolatile memory, and the like. The system processor 116 can include, but is not limited to, at least one microcontroller unit (MCU), microprocessor unit (MPU), central processing unit (CPU), graphics processing unit (GPU), physics processing unit (PPU), embedded controller (EC), or the like. The system processor 116 can include a memory operable to store or storing one or more instructions for operating components of the system processor 116 and operating components operably coupled to the system processor 116. The one or more instructions can include at least one of firmware, software, hardware, operating systems, embedded operating systems, and the like. The system processor 116 or the system 100 generally can include at least one communication bus controller to effect communication between the system processor 116 and the other elements of the system 100.

The interface controller 120 can link the data processing system 102 with one or more of the network 101 and the client system 103 by one or more communication interfaces. A communication interface can include, for example, an application programming interface ("API") compatible with a particular component of the data processing system 102 or the data processing system 102. The communication interface can provide a particular communication protocol compatible with a particular component of the data processing system 102 and a particular component of the client system 103. The interface controller 120 can be compatible with particular content objects, and can be compatible with particular content delivery systems corresponding to particular content objects. For example, the interface controller 120 can be compatible with transmission of video content, audio content, or any combination thereof. For example, the interface controller 120 can be compatible with payment processing transmissions by a protocol compatible with payment processing latency and encryption structures.

The authorization processor 130 can validate one or more tokens against one or more smart contracts. The authorization processor 130 can obtain one or more tokens, and can compare one or more token to one or more tokens requested by a particular smart contract. The authorization processor 130 can detect whether a particular token is compatible with a particular smart contract by detecting whether a particular token matches a particular token characteristic associated with a particular smart contract. For example, the authorization processor 130 can detect that a token is compatible with a smart contract based on comparing a hash of the token with a hash included in the smart contract. The authorization processor 130 can generate an authorization indication based on one or more determinations, and can transmit the authorization indication to the event processor 140. The authorization processor 130 can, for example, provide a container or one or more content objects to the event processor 140, in response to the authorization indication, by decrypting the encapsulation layer of the container. The authorization processor 130 can, for example, execute the smart contract with the compatible tokens to retrieve a particular container for the smart contract, or a reference to the particular container, from the container storage 158.

The event processor 140 can execute one or more actions in response to an authorization indication generated by the authorization processor 140. The event processor 140 can, for example, provide output from particular content objects within a particular container, in response to receiving a container or reference to a container from the authorization processor 130.

The cloud data repository 150 can store data associated with the system 100. The cloud data repository 150 can include one or more hardware memory devices to store binary data, digital data, or the like. The cloud data repository 150 can include one or more electrical components, electronic components, programmable electronic components, reprogrammable electronic components, integrated circuits, semiconductor devices, flip flops, arithmetic units, or the like. The cloud data repository 150 can include at least one of a non-volatile memory device, a solid-state memory device, a flash memory device, and a NAND memory device. The cloud data repository 150 can include one or more addressable memory regions disposed on one or more physical memory arrays. A physical memory array can include a NAND gate array disposed on, for example, at least one of a particular semiconductor device, integrated circuit device, and printed circuit board device. The cloud data repository 150 can include a non-fungible token storage 152, a fungible token storage 154, a smart contract storage 156, a container storage 158, and a blockchain storage 159.

The non-fungible token storage 152 can store one or more NFTs and corresponding addresses for particular NFTs that indicate links with the corresponding NFT. The non-fungible token storage 152 can include NFTs associated with the data processing system 102 or any component thereof, the client system 103 or any component thereof, any content object, or any combination thereof. The fungible token storage 154 can store one or more fungible tokens and semi-fungible tokens. The fungible token storage 154 can store corresponding addresses for particular fungible tokens that indicate links with the corresponding fungible tokens, and can store corresponding addresses for particular semi-fungible tokens that indicate links with the corresponding semi-fungible tokens. The non-fungible token storage 152 can include fungible tokens and semi-fungible tokens associated with the data processing system 102 or any component thereof, the client system 103 or any component thereof, any content object, or any combination thereof.

The smart contract storage 156 can store one or more smart contracts and corresponding addresses for particular smart contracts that indicate links with the corresponding smart contracts. The container storage 158 can store one or more containers and their contained content objects and corresponding addresses for particular containers that indicate links with the corresponding containers. The blockchain storage 159 can store one or more blockchains linked to one or more smart contracts, tokens, containers, or content objects, by corresponding addresses for particular smart contracts, tokens, containers, or content objects that indicate links with a particular blockchain.

The interface controller 122 can link the client system 103 with one or more of the network 101 and the data processing system 102 by one or more communication interfaces. A communication interface can include, for example, an application programming interface ("API") compatible with a particular component of the data processing system 102 or the data processing system 102. The communication interface can provide a particular communication protocol compatible with a particular component of the data processing system 102 and a particular component of the client system 103. The interface controller 120 can be compatible with particular content objects, and can be compatible with particular content delivery systems corresponding to particular content objects. For example, the interface controller 120 can be compatible with transmission of video content, audio content, or any combination thereof. For example, the interface controller 120 can be compatible with payment processing transmissions by a protocol compatible with payment processing latency and encryption structures. The communication interface of the client system 103 can be compatible with the communication interface of the data processing system 102 to perform unidirectional or bidirectional communication between the interface controllers 120 and 122.

The content processor 160 can execute one or more actions in response to an authorization indication generated by the authorization processor 140. The content processor 160 can, for example, receive output from particular content objects within a particular container, in response to receiving transmission by the interface controller 122 based on a container or reference to a container.

Figure 2:
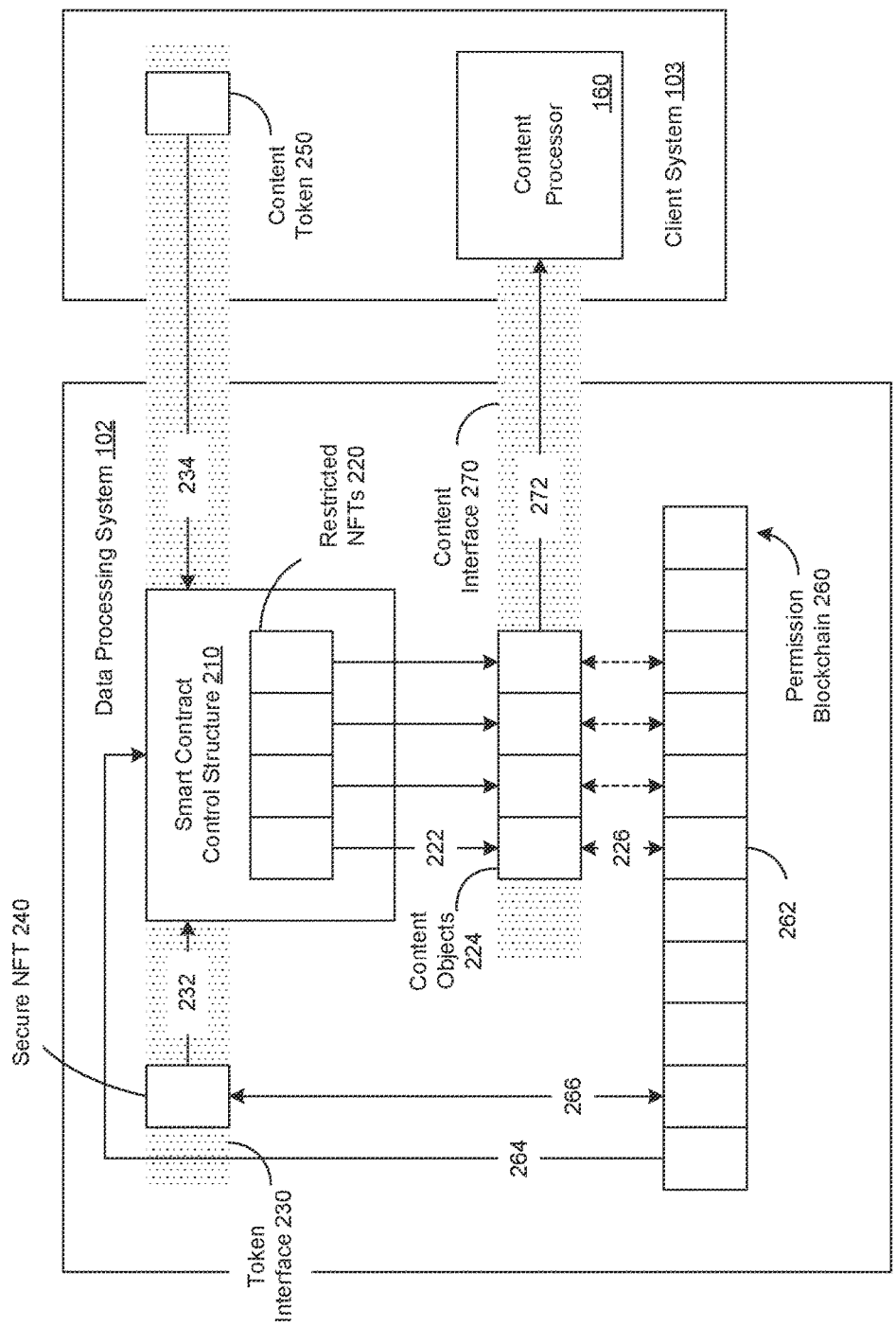
FIG. 2 illustrates an architecture in accordance with present implementations.

FIG. 2 illustrates an architecture in accordance with present implementations. As illustrated by way of example in FIG. 2, an example architecture 200 can include the data processing system 102 and the client system 103. The architecture 200 can include the content processor 160, a smart contract control structure 210, one or more restricted NFTs 220, one or more content links 222, one or more content objects 224, one or more blockchain links 226, a token interface 230, a security link 232, a client link 234, a secure NFT 240, a content token 250, a permission blockchain 260 with one or more blocks 262, a control link 264, a secure NFT link 266, a content interface 270, and a content link 272. A link as discussed herein can correspond to or include metadata. The metadata can, for example, be stored within or integrated with any smart contract, smart contract control structure, content object, block, blockchain, or any combination thereof.

The smart contract control structure 210 can include one or more instructions to restrict and transmit output of one or more of the content objects 224. The smart contract control structure 210 can correspond to an executable smart contract and can include a gateway component. The gateway component can include one or more instructions to restrict or prevent output of the restricted NFTs 220 in the absence of presence of one or more tokens compatible with the smart contract control structure 210. The smart contract control structure 210 can include an encapsulation layer that, for example, maintains the restricted NFTs in an encrypted state. The smart contract control structure 210 can permit access to the restricted NFTs based on a private key, for example, compatible with the encapsulation layer and operable to decrypt the encryption corresponding to the encapsulation layer. The gateway component can be compatible with and interface with the token interface 230, and the encapsulation layer can be integrated with the smart contract control structure 210.

The restricted NFTs 220 can each include a particular NFT and can correspond to particular content objects. A restricted NFT can be associated with a particular content object, and can be required to transmit output of the content object, transfer the content object to another storage location, or any combination thereof, for example. Each of the restricted NFTs 220 can indicate control of a particular content object of the content objects 224 by a corresponding content link of the content links 222. The content links 222 can include a reference, pointer, or the like, to or between each restricted NFT and each content object associated with that particular restricted NFT.

The content objects 224 can each include a particular data or instructions. A content objects can correspond to a collections of executable instructions or data that can be finite. For example, a content object can include a video file corresponding to a limited number of instances of video content. For example, a content object can include an audio file corresponding to a limited number of instances of audio content. For example, a content object can include a metric that increases with limited capacity, such as a physical measurement a financial instrument valuation, a periodic output based on a physical or scarce property, or any combination thereof.

The token interface 230 can include a communication channel between one or more of the smart contract control structure 210, the secure NFT at the data processing system 102, and the content token 250 at the client system 103. The token interface 230 can include an application programming interface compatible with the smart contract control structure 210 to detect the secure NFT at the data processing system 102, and the content token 250 at the client system 103. At least the token interface 230 or the smart contract control structure 210 can execute one or more instructions to determine whether one or more of the secure NFT 240 and the content token 250 are compatible with the smart contract control structure 210. The security link 232 can include a transmission path or communication path between the secure NFT 240 and the smart contract control structure 210 by the token interface 230. At least the token interface 230 or the smart contract control structure 210 can detect the secure NFT 240 via the security link 232. The client link 234 can include a transmission path or communication path between the content token 250 and the smart contract control structure 210 by the token interface 230. At least the token interface 230 or the smart contract control structure 210 can detect the content token 250 via the client link 234.

The secure NFT 240 can include an NFT associated with and controlled by the data processing system 102. Transmission of the secure NFT 240 can be restricted by the data processing system 102 to within the data processing system 102. For example, the secure NFT 240 can correspond to a "backup key" or "house key" that must be detected in order to the smart contract control structure 210 transmit output of the content objects 224 corresponding to the restricted NFTs 220. Thus, the secure NFT 240 can restrict authorization by the smart contract control structure 210 to the data processing system 102 environment. The content token 250 can include a token associated with and controlled by the client system 103. The content token 250 can include a fungible token or a semi-fungible token. For example, the content token 250 can include a fungible token to obtain output of a collection of freely accessible content objects 224. For example, the content token 250 can include a semi-fungible token to obtain output of a collection of content objects 224 accessible under limited conditions. Limited conditions can include content objects accessible by subscription. Transmission of the content token 250 can be restricted by the client system 103 to within the data processing system 102.

The permission blockchain 260 can include at least one blockchain including one or more of the blocks 262. The permission blockchain 260 can be linked to one or more content objects 224, secure NFTs 240, and smart contract control structures 210. The permission blockchain 260 can include a blockchain operated and controlled at the data processing system 102. The permission blockchain 260 can include a plurality of blockchains each corresponding to particular aspects of the links associated with the corresponding blockchains. The blocks 262 can include or store links to one or more objects associated with the blockchain. The blockchain links 226 can include a reference, pointer, or the like, to or between a block among the blocks 262 and a content object associated with that particular block. The control link 264 can include a reference, pointer, or the like, to or between a block among the blocks 262 and the smart contract control structure 210 associated with that particular block. The secure NFT link 266 can include a reference, pointer, or the like, to or between a block among the blocks 262 and the secure NFT 240 associated with that particular block.

The content interface 270 can include a communication channel between one or more of the content objects 224 at the data processing system 102, and the content processor 160 at the client system 103. The content interface 270 can include an application programming interface compatible with the content objects 224 to transmit data or instructions based on the content objects 224 to the content processor 160 of the client system 103. At least the content interface 270 or the content processor 160 can execute one or more instructions to obtain output of the content objects 224. The content link 272 can include a transmission path or communication path between the content objects 224 and the content processor 160 by the content interface 270. At least the content interface 270 or the content processor 160 can obtain output of the content objects 224 via the content link 272.

Figure 3:
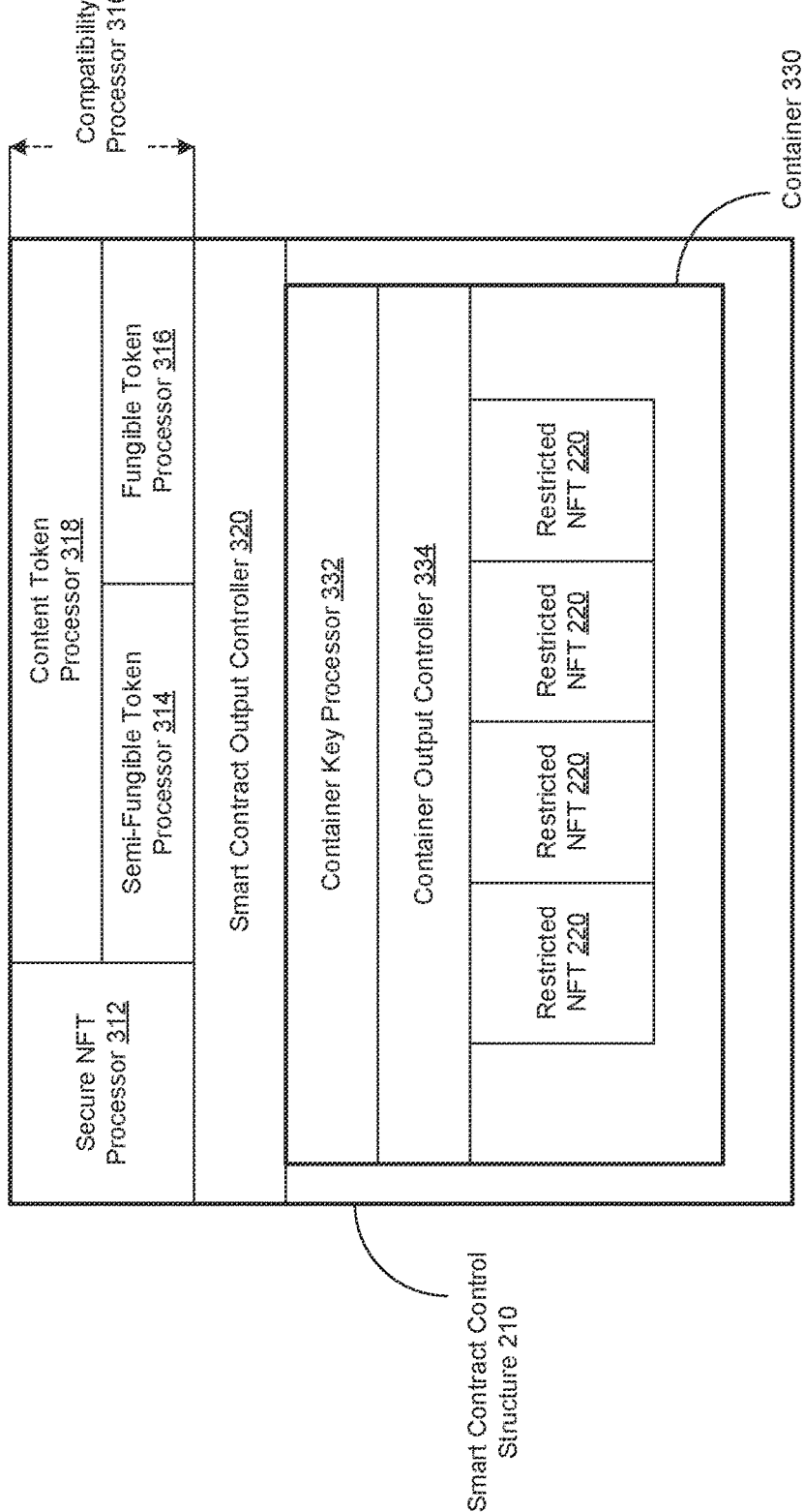
FIG. 3 illustrates a smart contract control architecture in accordance with present implementations.

FIG. 3 illustrates a smart contract control architecture in accordance with present implementations. As illustrated by way of example in FIG. 3, an example architecture 300 can include the smart contract control structure 210. The smart contract control structure 210 can include a compatibility processor 310, a smart contract output controller 320, and a container 330.

The compatibility processor 310 can communication with and validate one or more tokens. The compatibility processor 310 can include one or more interfaces corresponding to an API or a smart contract interface, for example. A smart contract interface can include one or more executable instructions integrated with a smart contract. The smart contract interface can execute instructions at the smart contract or triggered by the smart contract in response to detection of objects or conditions external to the smart contract. The compatibility processor 310 can comprise at least a portion of a control structure of the smart contract. The compatibility processor 310 can include a control structure. The compatibility processor 310 can include a secure NFT processor 312, a semi-fungible token processor 314, a fungible token processor 316, and a content token processor 318.

The secure NFT processor 312 can detect the presence of a secure NFT 240, and can determine whether the secure NFT 240 is compatible with the secure NFT processor 312. The secure NFT processor 312 can be configured to be compatible with a particular secure NFT 240, or can be generated to be compatible with a particular secure NFT 240. For example, the secure NFT processor 312 can be integrated with or store a hash based on a particular secure NFT 240 and a hash processor operable to generate a hash based on any secure NFT 240. The secure NFT processor 312 can generate a hash in response to detecting the presence of the secure NFT 240, and can determine whether the secure NFT 240 is compatible with the smart contract control structure, in response generating the hash, by comparting the generated hash with the stored hash. The secure NFT processor 312 can include logic to detect a secure NFT 240 passed to it, by, for example, a JSON object or a header argument.

The semi-fungible token processor 314 can detect the presence of a semi-fungible token, and can determine whether the semi-fungible token is compatible with the semi-fungible token processor 314. The semi-fungible token processor 314 can be configured to be compatible with a particular semi-fungible token, or can be generated to be compatible with a particular semi-fungible token. The semi-fungible token processor 314 can be configured to be compatible with a plurality of tokens having a particular characteristic, or can be generated to be compatible with a plurality of tokens having a particular characteristic. A particular characteristic can include, for example, a particular identifier or portion of an identifier of a token. For example, the semi-fungible token processor 314 can be integrated with or store a hash based on a particular semi-fungible token and a hash processor operable to generate a hash based on any semi-fungible token. The semi-fungible token processor 314 can generate a hash in response to detecting the presence of the semi-fungible token, and can determine whether the semi-fungible token is compatible with the smart contract control structure 210, in response generating the hash, by comparing the generated hash with the stored hash. The semi-fungible token processor 314 can include logic to detect a semi-fungible token passed to it, by, for example, an activation instruction from the content token processor 318.

The fungible token processor 316 can detect the presence of a fungible token, and can determine whether the fungible token is compatible with the fungible token processor 316. The fungible token processor 316 can be configured to be compatible with a particular fungible token, or can be generated to be compatible with a particular fungible token. The fungible token processor 314 can be configured to be compatible with a plurality of tokens having a particular characteristic, or can be generated to be compatible with a plurality of tokens having a particular characteristic. A particular characteristic can include, for example, a particular identifier or portion of an identifier of a token. For example, the fungible token processor 316 can be integrated with or store a hash based on a particular fungible token and a hash processor operable to generate a hash based on any fungible token. The fungible token processor 316 can generate a hash in response to detecting the presence of the fungible token, and can determine whether the fungible token is compatible with the smart contract control structure 210, in response generating the hash, by comparing the generated hash with the stored hash. The fungible token processor 316 can include logic to detect a fungible token passed to it, by, for example, an activation instruction from the content token processor 318.

The content token processor 318 can detect the presence of a semi-fungible token or a fungible token, and can transmit the semi-fungible token or the fungible token respectively to the semi-fungible token processor 314 or the fungible token processor 316. The fungible token processor 316 can be configured to be compatible with any semi-fungible fungible token or fungible token, or can be generated to be compatible with any semi-fungible token or fungible token. The fungible token processor 316 can be configured to identify a semi-fungible fungible token or a fungible token, or can be generated to identify any semi-fungible token or fungible token. For example, the content token processor 318 can identify a particular identifier or portion of an identifier of a token to determine whether the token includes a semi-fungible token or a fungible token. The content token processor 318 can transmit the token to the semi-fungible token processor 314 in response to a determination that the token includes a semi-fungible token. The content token processor 318 can transmit the token to the fungible token processor 314 in response to a determination that the token includes a fungible token. For example, the content token processor 318 can detect a semi-fungible content token 250 corresponding to limited-release content or assets, and can detect a fungible content token 250 corresponding to wide-release content or assets.

The smart contract output controller 320 can selectively transmit output from one or more of the restricted NFTs 220 based on determinations from one or more of the secure NFT processor 312, the semi-fungible token processor 314, and the fungible token processor 316. For example, the smart contract output controller 320 can include a communication channel and a control structure to activate or deactivate the communication channel. The communication channel can communicatively couple the container 330 with a communication interface external to the smart contract control structure. For example, the smart contract output controller 320 can activate the communication channel in response to a determination that a secure NFT 240 and a content token 250 are both compatible with the smart contract control structure 210.

The container 330 can include a security layer that restrict access to one or more of the restricted NTFs 220. The container 330 can include, for example, a security encapsulation that partially or completely encrypts one or more components of the container 330. The container 330 can include a container key processor 332, a container output controller 334, and one or more of the restricted NFTs 220.

The container key processor 332 can detect the presence of a private key, and can determine whether the private key is compatible with the container 330. The container key processor 332 can obtain the private key from one or more of the non-fungible token, a semi-fungible token or a fungible token, and can transmit the semi-fungible token or the fungible token respectively to the semi-fungible token processor 314 or the fungible token processor 316. For example, the private key can be stored entirely within the content token 250. For example, the private key can be stored entirely within the secure NFT 240, to restrict output from the container to the logical location corresponding to the secure NFT 240. For example, the private key can be stored partially within the secure NFT 240 and partially within the content token 250, to restrict output from the container to the logical location corresponding to the secure NFT 240 by a distributed key.

The container output controller 334 can selectively transmit output from one or more of the restricted NFTs 220 based on determinations from the container key processor 332. For example, the container output controller 334 can include a communication channel and a control structure to activate or deactivate the communication channel. The communication channel can communicatively couple the restricted NFTs 220 with smart contract output controller 320. For example, the container output controller 334 can activate the communication channel in response to a determination that the private key is compatible with the container key processor 332.

Figure 4:
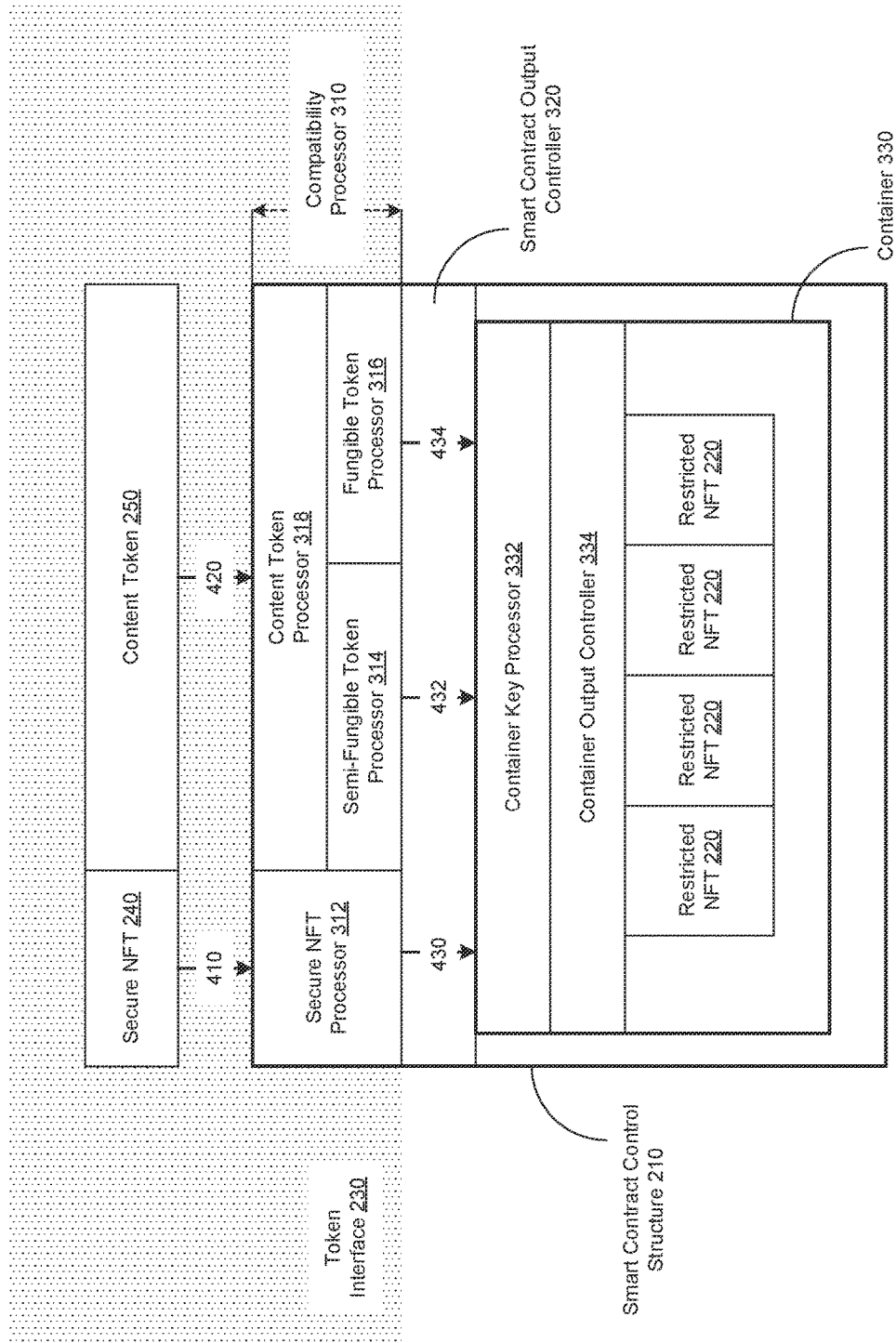
FIG. 4 illustrates a smart contract control architecture and a token interface, in accordance with present implementations.

FIG. 4 illustrates a smart contract control architecture and a token interface, in accordance with present implementations. As illustrated by way of example in FIG. 4, an example architecture 400 can include the smart contract control structure 210 and the token interface 230. The smart contract control structure 210 can include the compatibility processor 310, the smart contract output controller 320, and the container 330. The token interface 230 can perform detection 410 of the secure NFT 240, detection 420 of the content token 250, and one or more of detection 430 of the secure NFT or a portion thereof at the container 330, detection 432 of a semi-fungible token at the container 330, and detection 434 of a fungible token at the container 330.

The detection 410 can be responsive to an action by the token interface 230 to transmit the secure NFT 240 to the smart contract control structure 210. The secure NFT processor 312 can detect the secure NFT 240 obtained by the smart contract control structure 210 via the token processor 230. The detection 420 can be responsive to an action by the token interface 230 to transmit the content token 250 to the smart contract control structure 210. The content token processor 318 can detect the content token 250 obtained by the smart contract control structure 210 via the token processor 230.

The detection 430 can be responsive to an action by the secure NFT processor 312 to transmit the secure NFT 240 to the container key processor 332. The container key processor 332 can detect the secure NFT 240 obtained by the smart contract control structure 210 via the secure NFT processor 312. The detection 432 can be responsive to an action by semi-fungible token processor 314 to transmit the content token 250 to the container key processor 332. The container key processor 332 can detect the content token 250 obtained by the smart contract control structure 210 via the semi-fungible token processor 314. The detection 434 can be responsive to an action by fungible token processor 316 to transmit the content token 250 to the container key processor 332. The container key processor 332 can detect the content token 250 obtained by the smart contract control structure 210 via the fungible token processor 316. The container key processor 332 can obtain a private key based on one or more of the obtained secure NFT 240 and the obtained content token 250.

Figure 5:
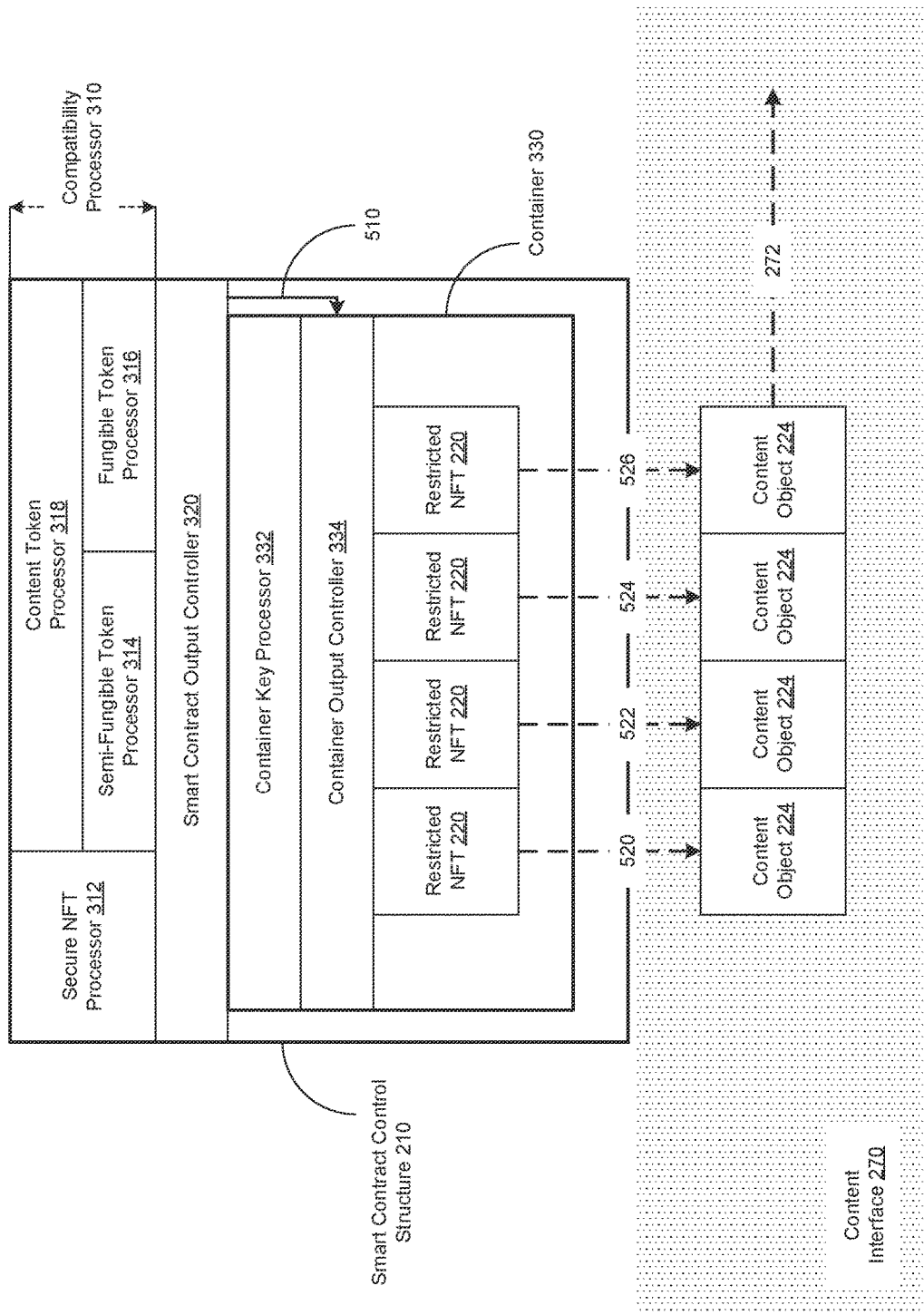
FIG. 5 illustrates a smart contract control architecture and a content interface, in accordance with present implementations.

FIG. 5 illustrates a smart contract control architecture and a content interface, in accordance with present implementations. As illustrated by way of example in FIG. 5, an example architecture 500 can include the smart contract control structure 210 and the content interface 270. The smart contract control structure 210 can include the compatibility processor 310, the smart contract output controller 320, and the container 330. The content interface 270 can perform activation 510 of the container output controller 334, and one or more of the activations 520, 522, 524 and 526 of one or more of the content objects 224 respectively linked to one or more of the corresponding restricted NFTs 220.

The activations 520, 522, 524 and 526 can be responsive to an action by one or more of the smart contract output controller 320 and the container output controller 334 to transmit the output of content objects 224 corresponding to the restricted NFTs 220. For example, the smart contract control structure can transmit output of video content of the content objects 224 to the client system 103 in response to validating the content token 250 obtained from the client system 103 by the token interface 230. For example, the smart contract control structure can transmit payment of financial, equity, derivative, cash, or crypto assets of the content objects 224 to the client system 103 in response to validating the content token 250 obtained from the client system 103 by the token interface 230.

Figure 6:
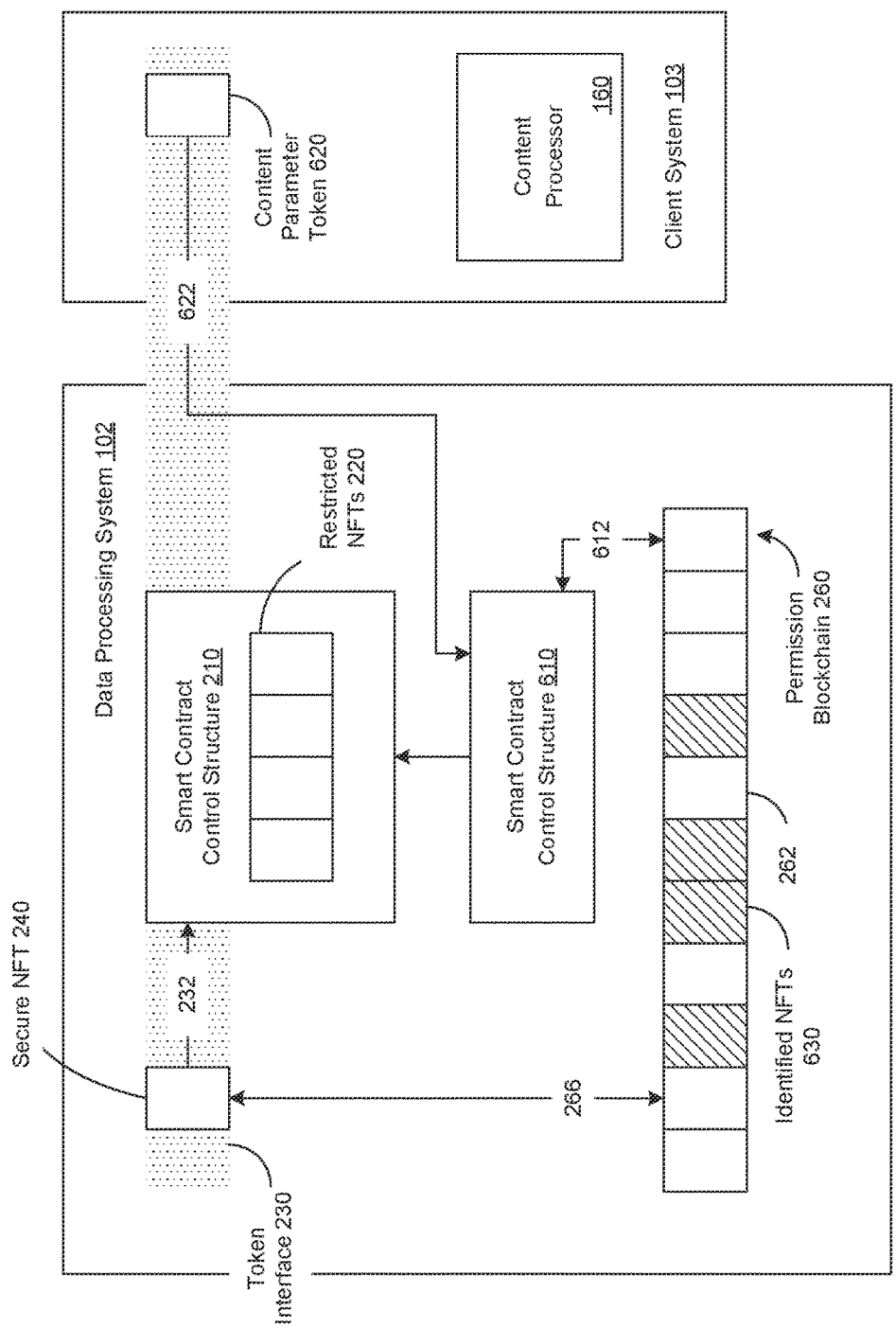
FIG. 6 illustrates an architecture compatible with a content parameter token, in accordance with present implementations.

FIG. 6 illustrates an architecture compatible with a content parameter token, in accordance with present implementations. As illustrated by way of example in FIG. 6, an example architecture 600 can include the data processing system 102 and the client system 103. The architecture 600 can include the content processor 160, the smart contract control structure 210, the restricted NFTs 220, the token interface 230, the security link 232, the secure NFT 240, the permission blockchain 260 with the blocks 262, the secure NFT link 266, a smart contract control structure 610, a blockchain control link 612, a content parameter token 620, a client link 622, and one or more identified NFTs 630.

The smart contract control structure 610 can include one or more instructions to generate or modify the smart contract control structure 210. The smart contract control structure 610 can correspond to an executable smart contract and can include a gateway component. The gateway component can include one or more instructions to restrict or prevent execution of the smart contract control structure 610 in the absence of presence of one or more tokens compatible with the smart contract control structure 610. The smart contract control structure 210 can generate or modify the smart contract control structure 210 based on a predetermined private key. The smart contract control structure 610 can be compatible with the permission blockchain 260 and can modify the permission blockchain 260 by the blockchain control link 612. The blockchain control link 612 can directly or indirectly address or link to one or more of the blocks 262.

The content parameter token 620 can include an NFT, a fungible token or a semi-fungible token. For example, the content parameter token 620 can include an NFT that identifies one or more content parameters of one or more content objects 224. For example, content parameters can include a content identifier, source identifier, publisher identifier, content media type, asset identifier, asset type, content output type, asset output type, asset payment type, asset payment periodicity, asset class, or any combination thereof. For example, the content parameter token 620 can identify all content objects corresponding to episodes of a particular season of a particular television show. For example, the content parameter token 620 can identify all content objects corresponding to shares of a particular equity having a price per share within a particular range and a particular dividend payment processing schedule. The client link 622 can include a transmission path or communication path between the content parameter token 620 and the smart contract control structure 610 by the token interface 230. At least the token interface 230 or the smart contract control structure 610 can detect the content parameter token 620 via the client link 622.

The identified NFTs 630 can correspond to one or more content objects having or corresponding to particular content parameters. The identified NFTs 630 be linked to one or more content objects 224 having output to be restricted. The smart contract control structure 610 can modify the permission blockchain 260 via the blockchain control link 612 to restrict one or more of the identified NFTs 630 at the permission blockchain 260. For example, the smart contract control structure 610 can remove the identified NFTs 630 from the blockchain and replace the links to the identified NFTs 630 with links to the smart contract control structure 210. The smart contract control structure 610 can transfer, for example, the identified NFTs 630 to the smart contract control structure 210 to convert the identified NFTs 630 to the restricted NFTs 220. The smart contract control structure 610 can replicate, for example, the identified NFTs 630 at the smart contract control structure 210 to convert the identified NFTs 630 to the restricted NFTs 220.

Figure 7:
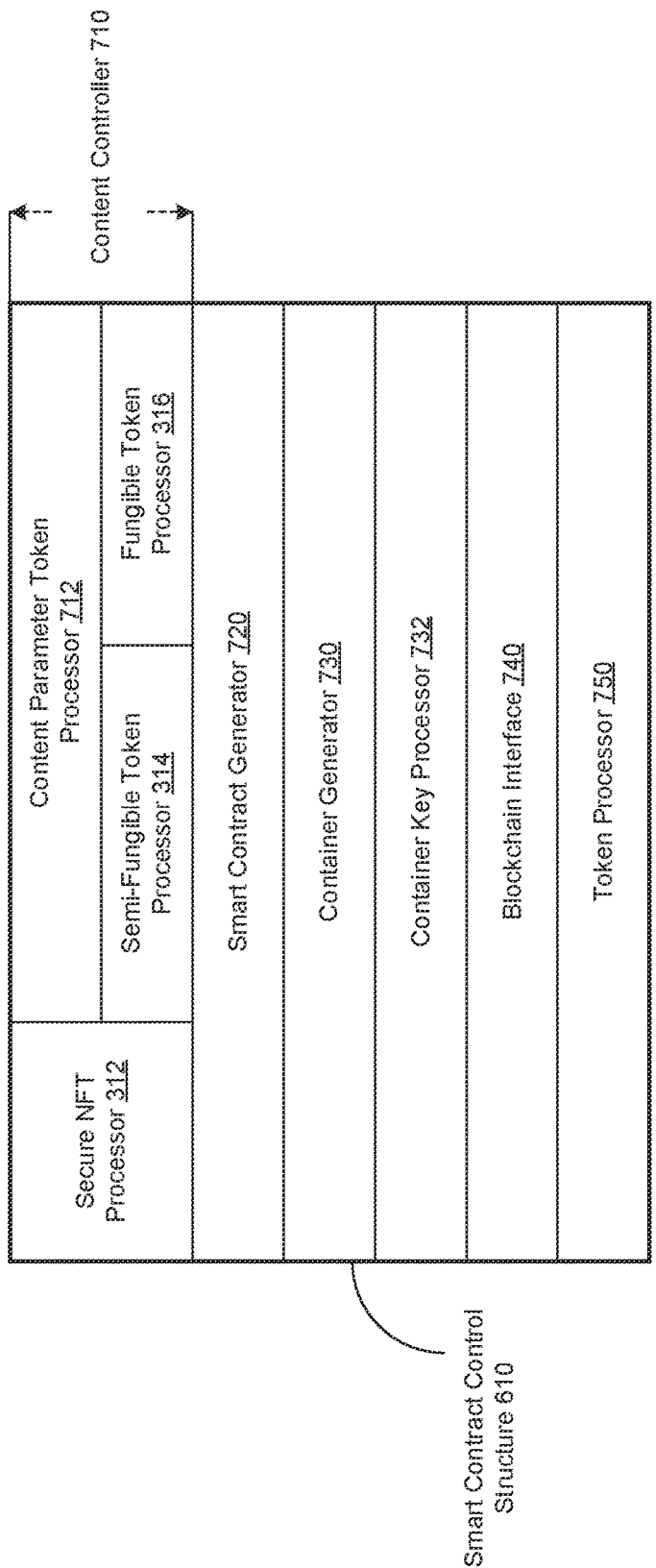
FIG. 7 illustrates a smart contract control architecture compatible with a content parameter token, in accordance with present implementations.

FIG. 7 illustrates a smart contract control architecture compatible with a content parameter token, in accordance with present implementations. As illustrated by way of example in FIG. 7, an example architecture 700 can include the smart contract control structure 610. The smart contract control structure 610 can include a content controller 710, a smart contract generator 720, a container generator 730, a container key processor 732, a blockchain interface 740, and a token processor 750.

The content controller 710 can comprise at least a portion of a control structure of the smart contract. The content controller 710 can include a control structure. The content controller 710 can include the secure NFT processor 312, the semi-fungible token processor 314, the fungible token processor 316, and a content parameter token processor 712.

The content parameter token processor 712 can detect the presence of a semi-fungible token or a fungible token, and can transmit the semi-fungible token or the fungible token respectively to the semi-fungible token processor 314 or the fungible token processor 316. The fungible token processor 316 can be configured to be compatible with any semi-fungible fungible token or fungible token, or can be generated to be compatible with any semi-fungible token or fungible token. The fungible token processor 316 can be configured to identify a semi-fungible fungible token or a fungible token, or can be generated to identify any semi-fungible token or fungible token. For example, the content token processor 318 can identify a particular identifier or portion of an identifier of a token to determine whether the token includes a semi-fungible token or a fungible token. The content parameter token processor 712 can transmit the token to the semi-fungible token processor 314 in response to a determination that the token includes a semi-fungible token. The content parameter token processor 712 can transmit the token to the fungible token processor 314 in response to a determination that the token includes a fungible token. For example, the content parameter token processor 712 can detect a semi-fungible content parameter token 620 issued to a limited number of user or client systems, and can detect a fungible content parameter token 620 issued without restriction to an unlimited or arbitrary number of user or client systems.

The smart contract generator 720 can generate a smart contract and control structures of the smart contract based on one or more of the content parameter token 620 and the secure NFT 240. The smart contract generator 720 can generate a smart contract compatible with the identified NFTs 630 and restricted to output based on detection of the secure NFT 240. The container generator 730 can generate a container embedded within a smart contract, and control structures of the container, based on one or more of the content parameter token 620 and the secure NFT 240. The container generator 730 can generate a container encapsulating the identified NFTs 630 and restricted to output based on detection of the secure NFT 240. The container key processor 732 can generate a private key compatible with a container generated by the container generator 730, based on one or more of the content parameter token 620 and the secure NFT 240. The container key processor 732 can generate a private key to encrypt the encapsulation including the identified NFTs 630 and restricted to output based on detection of the secure NFT 240. The blockchain interface 740 can be compatible with the permission blockchain 260. The smart contract control structure 610 can modify the permission blockchain 260 by the blockchain interface 740. The blockchain interface 740 can include an API compatible with the permission blockchain 260. The token processor 750 can generate a content token compatible with a container generated by the container generator 730 and a smart contract generated by the smart contract generator 720, based on one or more of the content parameter token 620 and the secure NFT 240. The token processor 750 can transmit the content token to one or more client systems, or can maintain the content token at the data processing system.

Figure 8:
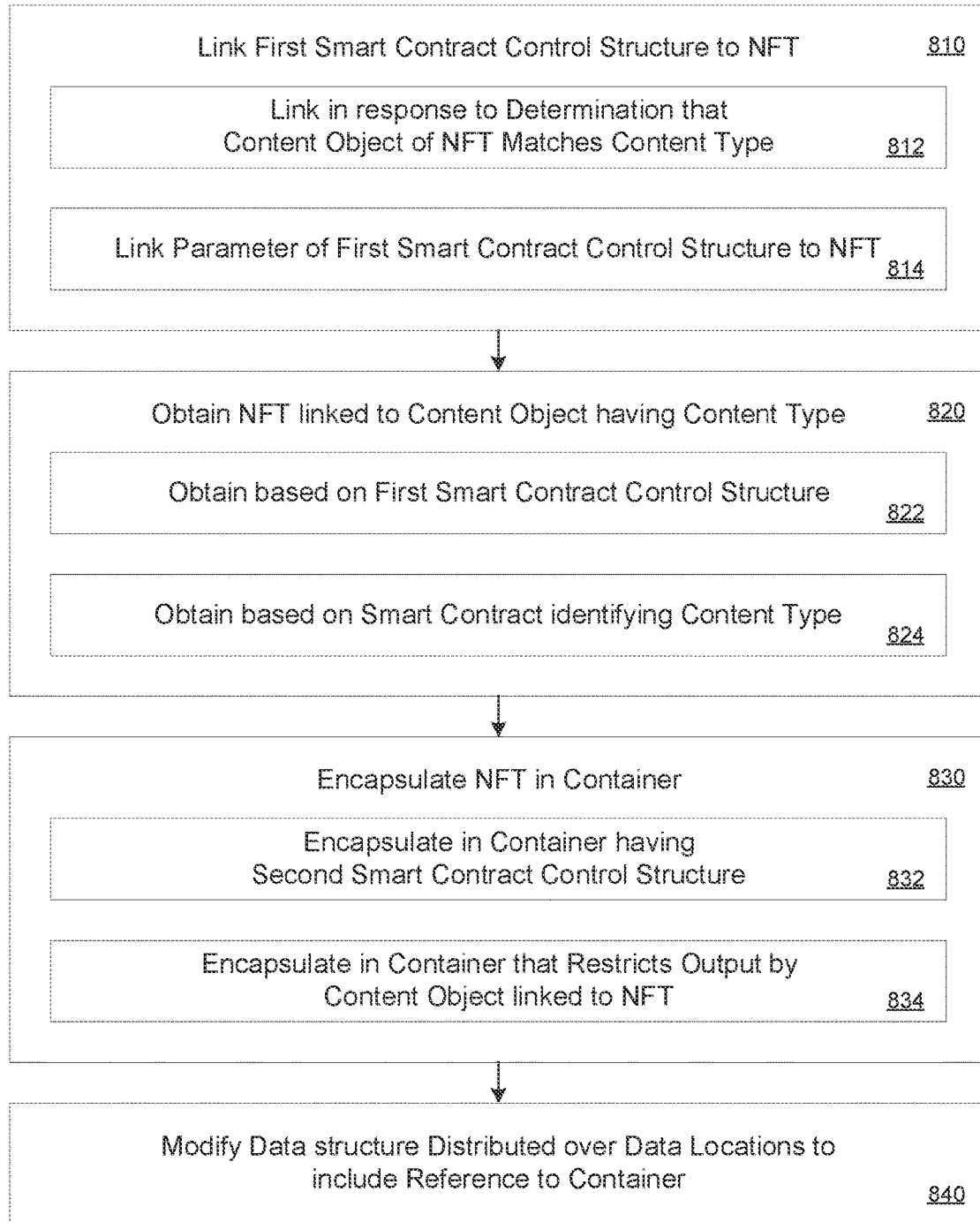
FIG. 8 illustrates a method for tokenized structured data sharing in accordance with present implementations.

FIG. 8 illustrates a method for tokenized structured data sharing in accordance with present implementations. At least one of the example systems 100, 200 and 600, or the example structures 300, 400, 500 and 700, can perform method 800 according to present implementations. The method 800 can begin at 810. At 810, the method can link a first smart contract control structure to an NFT. 810 can include at least one of 812 and 814. At 812, the method can link a first smart contract control structure to an NFT in response to a determination that a content object of an NFT matches a content type. At 814, the method can link a parameter of a first smart contract control structure to an NFT. The method 800 can then continue to 820. At 820, the method can obtain an NFT linked to a content object having a content type. 820 can include at least one of 822 and 824. At 822, the method can obtain an NFT linked to a content object having a content type based on a first smart contract control structure. At 824, the method can obtain an NFT linked to a content object having a content type based on a smart contract identifying a content type. The method 800 can then continue to 830.

At 830, the method can encapsulate an NFT in a container. 830 can include at least one of 832 and 834. At 832, the method can encapsulate an NFT in a container having a second smart contract control structure. At 834, the method can encapsulate an NFT in a container that restricts output by content object linked to the NFT. The method 800 can then continue to 840. At 840, the method can modify data structure distributed over data locations to include reference to container. For example, a data structure can include one or more blockchains, and a reference can include one or more links with a block of a blockchain.

Figure 9:
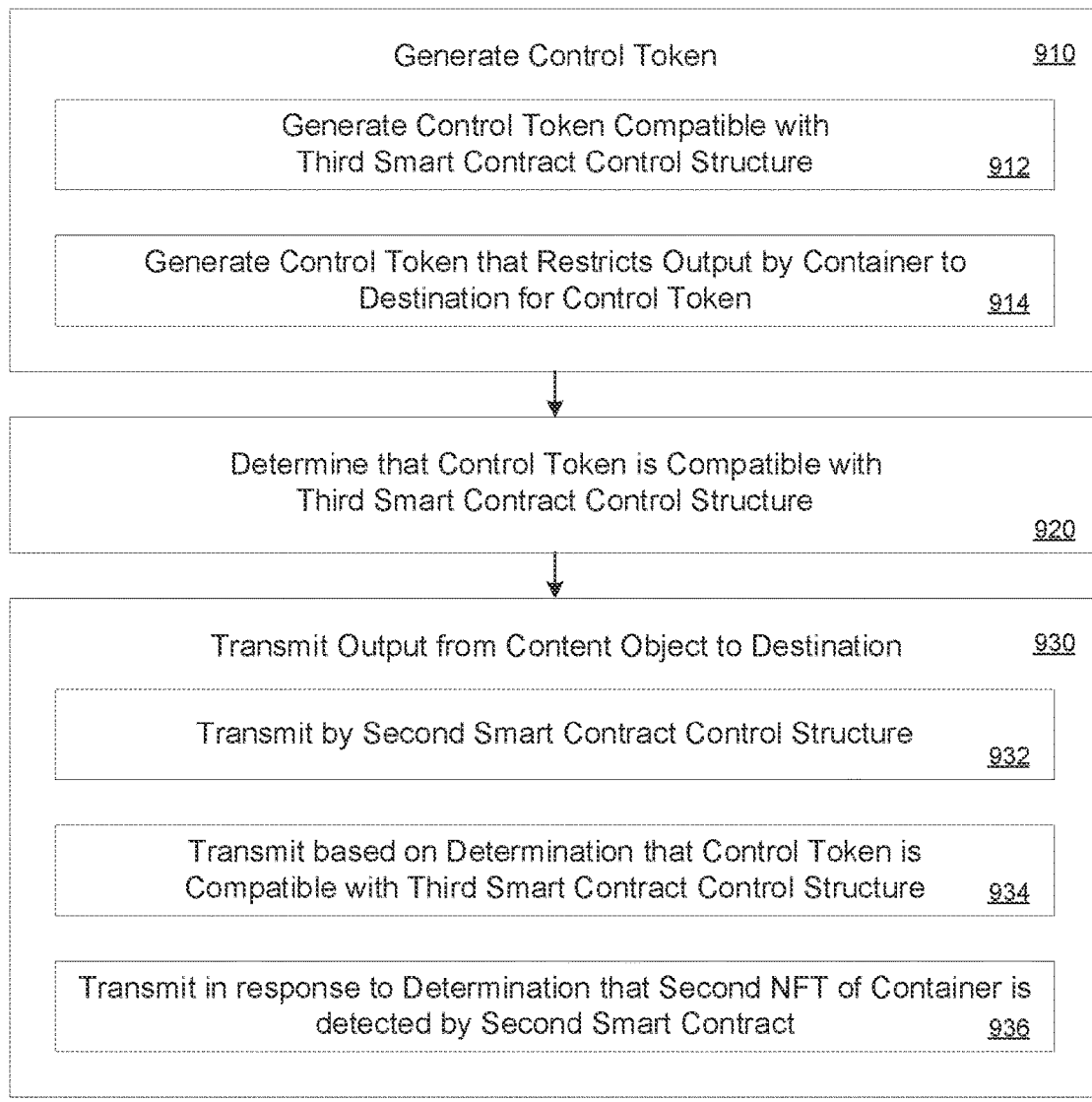
FIG. 9 illustrates a method for tokenized structured data sharing in accordance with present implementations.

FIG. 9 illustrates a method for tokenized structured data sharing in accordance with present implementations. At least one of the example systems 100, 200 and 600, or the example structures 300, 400, 500 and 700, can perform method 900 according to present implementations. The method 900 can begin at 910. At 910, the method can generate a control token. 910 can include at least one of 912 and 914. At 912, the method can generate a control token compatible with a third smart contract control structure. At 914, the method can generate a control token that restricts output by a container to a destination corresponding to a control token. The method 900 can then continue to 920. At 920, the method can determine that a control token is compatible with a third smart contract control structure. The method 900 can then continue to 930. At 930, the method can transmit output from a content object to a destination. 930 can include at least one of 932, 934 and 936. At 932, the method can transmit output from a content object to a destination by a second smart contract control structure. At 934, the method can transmit output from a content object to a destination based on a determination that a control token is compatible with a third smart contract control structure. At 936, the method can transmit output from a content object to a destination in response to a determination that a second NFT of a container is detected by a second smart contract.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A system to share data by a token structure including a non-fungible token (NFT), the system comprising:
    at least one memory and one or more processors configured to:
    obtain, based on a first control structure that identifies a content type, an NFT linked to a content object corresponding to the content type;
    encapsulate the NFT within a container, the container having a second control structure that restricts output by the content object linked to the encapsulated NFT;
    generate a control token compatible with a third control structure that restricts output by the container to a destination corresponding to the control token;
    determine by the third control structure that the control token is compatible with the third control structure; and
    transmit, by the second control structure and based on the determination that the control token is compatible with the third control structure, the output from the content object to the destination.

2. The system of claim 1, the NFT comprising a plurality of NFTs each linked to corresponding ones of a plurality of content objects comprising the content object.

3. The system of claim 1, the first control structure comprising a first smart contract that includes a parameter, the one or more processors further configured to:
    link, in response to a determination that the content object corresponds to the content type, the parameter of the first smart contract to the NFT.

4. The system of claim 1, the second control structure comprising a second smart contract that includes a first control heuristic, the one or more processors further configured to:
    transmit, in response to a determination by the first control heuristic that a second NFT corresponding to the container is detected by the second smart contract, output by the content object to the destination.

5. The system of claim 4, the NFT comprising a private key and the container comprising an encapsulation layer compatible with the private key.

6. The system of claim 1, the third control structure comprising a third smart contract that includes a second control heuristic, the one or more processors further configured to:
    transmit, in response to a determination by the second control heuristic that the control token is authorized by the third smart contract, output by the content object to the destination.

7. The system of claim 1, the one or more processors further configured to:
    modify a first data structure distributed over a plurality of data locations to include a first reference to the container.

8. The system of claim 7, the one or more processors further configured to:
    modify a second data structure distributed over one or more of the plurality of data locations to include a second reference to the content object.

9. The system of claim 1, the control token comprising a fungible token.

10. The system of claim 9, the fungible token authorizing the destination to receive the output by the content object for a predetermined time period.

11. A method to share data by a token structure including a non-fungible token (NFT), the method comprising:
    obtaining, based on a first control structure identifying a content type, an NFT linked to a content object corresponding to the content type;
    encapsulating the NFT within a container, the container having a second control structure that restricts output by the content object linked to the encapsulated NFT;
    generating a control token compatible with a third control structure that restricts output by the container to a destination corresponding to the control token;
    determining, by the third control structure, that the control token is compatible with the third control structure; and
    transmitting, by the second control structure and based on the determination that the control token is compatible with the third control structure, the output from the content object to the destination.

12. The method of claim 11, the NFT comprising a plurality of NFTs each linked to corresponding ones of a plurality of content objects comprising the content object.

13. The method of claim 11, the first control structure comprising a first smart contract that includes a parameter, the method further comprising:
    linking, in response to a determination that the content object corresponds to the content type, the parameter of the first smart contract to the NFT.

14. The method of claim 11, the second control structure comprising a second smart contract that includes a first control heuristic, the method further comprising:
    transmitting, in response to a determination by the first control heuristic that a second NFT corresponding to the container is detected by the second smart contract, output by the content object to the destination.

15. The method of claim 14, the second NFT comprising a private key and the container comprising an encapsulation layer compatible with the private key.

16. The method of claim 11, the third control structure comprising a third smart contract that includes a second control heuristic, the method further comprising:
    transmitting, in response to a determination by the second control heuristic that the control token is authorized by the third smart contract, output by the content object to the destination.

17. The method of claim 11, the control token comprising a fungible token.

18. A computer readable medium including one or more instructions stored thereon and executable by a processor to:
    obtain, by the processor and based on a first control structure that identifies a content type, a non-fungible token (NFT) linked to a content object corresponding to the content type;
    encapsulate, by the processor, the NFT within a container, the container having a second control structure that restricts output by the content object linked to the encapsulated NFT;

generate, by the processor, a control token compatible with a third control structure that restricts output by the container to a destination corresponding to the control token;

determine, by the processor, by the third control structure that the control token is compatible with the third control structure; and transmit, by the processor via the second control structure and based on the determination that the control token is compatible with the third control structure, the output from the content object to the destination.

19. The computer readable medium of claim 18, the computer readable medium further including one or more instructions executable by the processor to:

link, by the processor in response to a determination that the content object corresponds to the content type, a parameter of a first smart contract to the NFT;

transmit, by the processor in response to a determination by a first control heuristic that a second NFT corresponding to the container is detected by a second smart contract and a determination by a second control heuristic that the control token is authorized by a third smart contract, the output by the content object to the destination; and the first control structure comprising the first smart contract including the parameter, the second control structure comprising the second smart contract including the first control heuristic, and the third control structure comprising the third smart contract including the second control heuristic.

20. The computer readable medium of claim 18, the control token comprising a fungible token.

* * * * *